E. NELSON.
CABINET.
APPLICATION FILED FEB. 13, 1914.

1,133,997.

Patented Mar. 30, 1915.
2 SHEETS—SHEET 1.

Witnesses
Gerald Hennesy
D. W. Gould.

Inventor
Erik Nelson,
By Victor J. Evans
Attorney

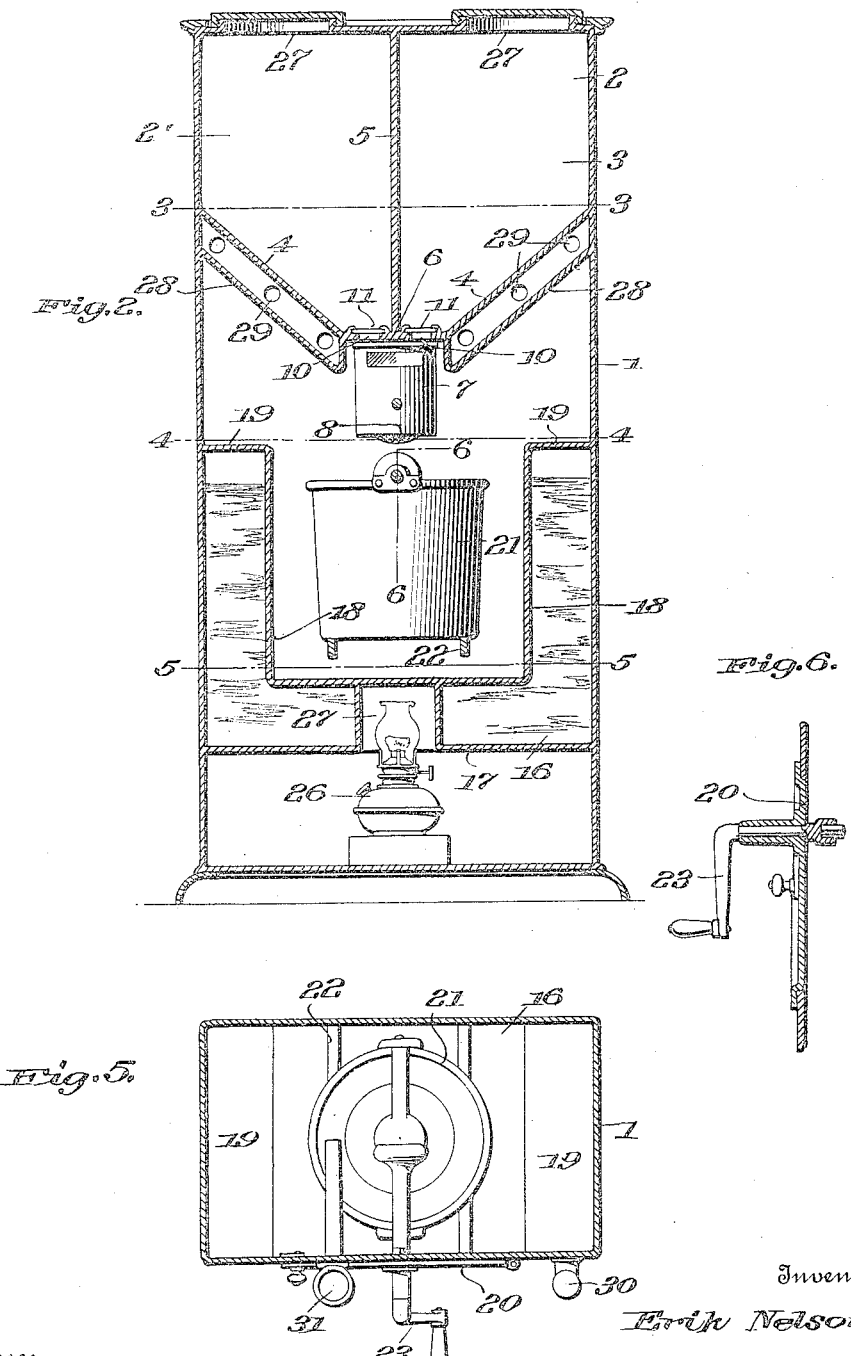

UNITED STATES PATENT OFFICE.

ERIK NELSON, OF HOLDREDGE, NEBRASKA.

CABINET.

1,133,997.

Specification of Letters Patent.

Patented Mar. 30, 1915.

Application filed February 13, 1914. Serial No. 818,542.

*To all whom it may concern:*

Be it known that I, ERIK NELSON, a citizen of the United States, residing at Holdredge, in the county of Phelps and State of Nebraska, have invented new and useful Improvements in Cabinets, of which the following is a specification.

The invention relates to an improvement in cabinets designed particularly for household or kitchen use, and comprehending specifically a cabinet within which is arranged for desirable coöperation a mixer, kneader and heat supplying section, whereby bread may be mixed, kneaded and raised within the cabinet and without necessitating the application of the hands directly thereto during any of such operations.

The main object of the present invention is the provision of a cabinet in which is arranged in coöperative relation a means for mixing, kneading and heating the material so that the complete bread making operation prior to the baking may be readily and expeditiously accomplished within full view and under full control of the operator, and without the necessity of a direct handling of the material, whereby a more uniform and cleanly mixture is insured and the usual refuse accumulation wholly avoided.

The invention in its preferred form of details will be described in the following specification, reference being had particularly to the accompanying drawings, in which:—

Figure 1:
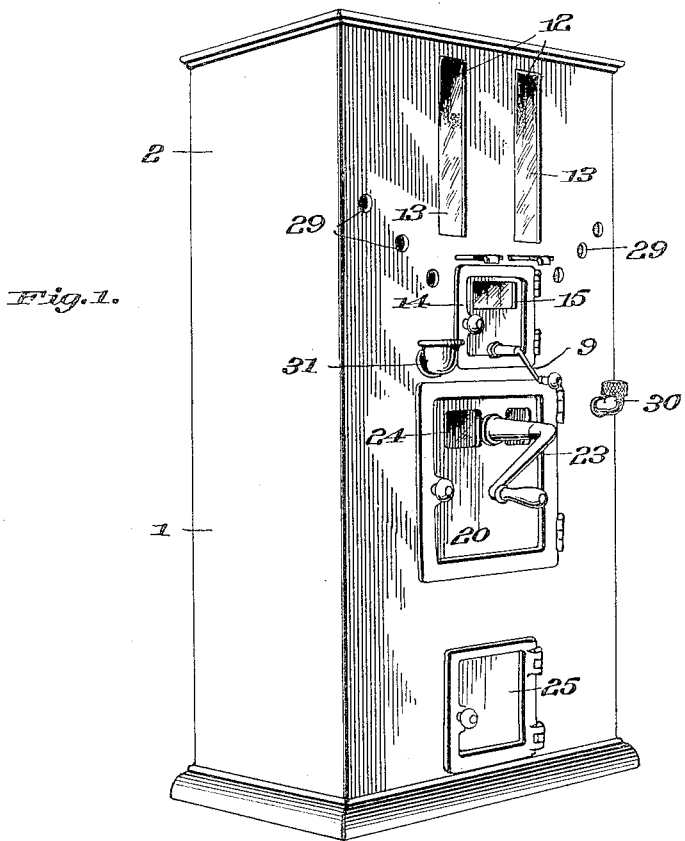
Figure 3:
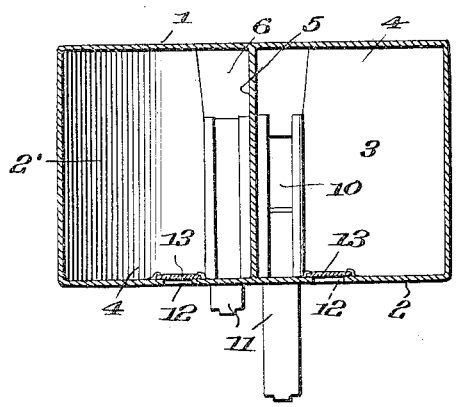
Figure 4:
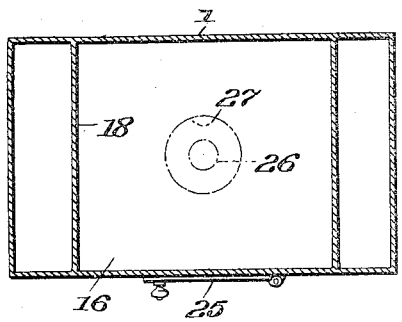

Figure 1 is a perspective view of the improved cabinet. Fig. 2 is a vertical central section of the same. Figs. 3, 4, 5 and 6 are transverse sections on lines 3—3, 4—4, 5—5 and 6—6 respectively of Fig. 2.

Referring particularly to the accompanying drawings my improved cabinet comprises a casing 1 preferably though not necessarily rectangular in shape. The casing is wholly inclosed except for the filling and door openings, to be later described, and is preferably constructed of metal to render the same moisture and vermin proof.

The upper portion 2 of the casing is formed to provide duplicate flour bins 2′ and 3, said bins being formed by providing inclined bottoms 4 between the side walls of the casing and a vertical partition 5 depending from the top wall. The inner or approximate ends of the bottoms 4 are disposed in spaced relation and are connected by a floor 6 closing said spaces, said floors extending an appreciable distance on each side of the vertical partition 5. The floor 6 is formed to removably receive and support a sifter 7, the upper end of the sifter being removably secured to the lower surface of the floor. The sifter is of any usual or preferred type, preferably a body of screen material, in which is arranged stirring arms 8 operated by a handle 9. The floor 6 in line with normal position of the sifter is formed with openings 10 normally closed by slides 11, whereby the material from either bin 2 or 3 may be discharged into the sifter at will. One side of the casing is formed on each side of the line of the partition 5 with elongated slotted openings 12 designed to be covered by glass or similar material 13, whereby the interior of the respective bins is to be at all times visible to enable the user to determine the quantity and character of the material in the bins. In line with the position occupied by the sifter the casing is formed with an opening closed by a door 14, the operating handle of the sifter being arranged in the other side of the door. The door 14 is provided with a side opening 15 protected by glass or the like, through which the upper portion of the sifter is visible, in order to determine the quantity of material delivered to the sifter as will be necessary.

Arranged within the casing below the sifter is a water chamber 16, preferably formed by securing a strip 17 transverse the casing above the bottom thereof and a second strip 18 in spaced relation to the side and end walls and having a bottom in spaced parallelism with the bottom strip 17, the upper ends of the spaces between the casing wall and the upright portions of the strip 18 being closed by transverse sections 19. As thus constructed the heating chamber is provided, which includes four hollow spaced walls arranged in an outline corresponding to the outline of the casing with the hollow bottom establishing communication with all of said walls, the space within the walls and above the bottom being wholly free of obstruction. One side of the chamber 16 is provided with a rectangular open space through the wall, the chamber of course being closed around the space. This space forms an entrance to the interior space between the walls of the chamber and is designed to be closed by a door 20. A bread kneader and mixer of any appropriate type as 21 is designed to be inserted in the space between the walls of the chamber, being supported upon a framework 22 arranged in such space. The bread kneader and mixer is thus disposed immediately below the sifter so that the material from the sifter can be delivered directly to the kneader and mixer. The handle 23 whereby the usual mixing appliances within the kneader and mixer is arranged beyond the door 20 for operation when the door is closed and said door is formed with a side opening 24 through which the operation of the kneader and mixer is visible.

One of the walls of the casing adjacent the bottom thereof is formed with an opening closed by a door 25, through which opening is designed to be inserted a lamp or other heater 26. Preferably the chamber 16 is formed in its bottom with a recessed portion 27 to receive the upper end of the heater, said recessed portion being of course closed against the interior of the chamber and terminating below the horizontal section of the strip 18. The upper wall of the casing is provided with a filling opening 27 adapted to be closed by any type of removable cap, there being one of such openings for each bin 2 and 3. The bottoms 4 of the bins are preferably of double type, that is an additional section 28 is arranged below and in spaced parallel relation with the bottom, and the space provided between the bottom proper and the additional section 28 communicates with the atmosphere through openings 29 formed in the wall of the casing. This provides for preventing an excess amount of heat reaching the material within the bins, as will be evident. The chamber 16 is provided with a filling opening 30 through which said chamber is designed to be filled with water, and the casing is formed in one wall thereof with an opening 31, arranged above the kneader and mixer, so that the necessary water for the mixing operation may be directly introduced into the mixer without the necessity of disturbing the latter.

The operation of the various parts of the improved cabinet will be readily apparent from the above description taken in connection with the drawings, it being obvious that the heater by imparting the heat to the water within the chamber 16 will surround the kneader and mixer with a uniform and constant heat which will serve to effectively raise the dough therein after mixing and kneading thereof.

What is claimed is:—

1. A cabinet including an inclosed casing, a bin formed in the upper end thereof, plates spaced from the under surface of the bin for forming a ventilating space which communicates with the atmosphere through apertures formed in the casing, a sifter supported below and in controllable communication with the bin, a water chamber including a bottom and sides of hollow square form, a kneader and mixer arranged within the space between said sides of the chamber, and a heat chamber below said water chamber adapted to receive a heating element, whereby the contents of said kneader and mixer will be heated through the conductivity of the water in said water chamber.

2. As a new article of manufacture, a cabinet including an inclosed casing, a bin formed in the upper end thereof, plates spaced from the under surface of the bin for forming a ventilating space which communicates with the atmosphere through apertures formed in the casing, a sifter supported in the sides of said casing below and in controllable communication with the bin, a water chamber including a bottom and sides of hollow square form, a heating chamber below said water chamber, and a kneader and mixer arranged within the space between said sides of the chamber, the wall of the casing overlying the bin being formed with a side opening approximating the full height of the bin, the casing wall being formed with an opening above the kneader and mixer for viewing the contents therein, the casing wall being formed with openings to permit the entrance of the sifter and kneader and mixer, and doors closing said openings, the operating means of the kneader and mixer extending through and being operable beyond the closed doors.

In testimony whereof I affix my signature in presence of two witnesses.

ERIK NELSON.

Witnesses:
E. W. BEGHTOL,
J. P. ANDERSON.

Copies of this patent may be obtained for five cents each, by addressing the "Commissioner of Patents, Washington, D. C."